United States Patent
Hayashi et al.

(10) Patent No.: US 9,657,860 B2
(45) Date of Patent: May 23, 2017

(54) VALVE ELEMENT AND FLUID CONTROL VALVE

(71) Applicant: HORIBA STEC, CO., Ltd., Kyoto-shi, Kyoto (JP)

(72) Inventors: Shigeyuki Hayashi, Kyoto (JP); Tadahiro Yasuda, Kyoto (JP); Kazuya Ohsa, Kyoto (JP)

(73) Assignee: HORIBA STEC, Co., Ltd., Kyoto-shi, Kyoto (JP)

( * ) Notice: Subject to any disclaimer, the term of this patent is extended or adjusted under 35 U.S.C. 154(b) by 105 days.

(21) Appl. No.: 14/019,438

(22) Filed: Sep. 5, 2013

(65) Prior Publication Data

US 2014/0070128 A1    Mar. 13, 2014

(30) Foreign Application Priority Data

Sep. 7, 2012   (JP) ................. 2012-196980

(51) Int. Cl.
| | |
|---|---|
| *F16K 25/00* | (2006.01) |
| *F16K 1/36* | (2006.01) |
| *F16K 1/44* | (2006.01) |

(52) U.S. Cl.
CPC ............. *F16K 25/005* (2013.01); *F16K 1/36* (2013.01); *F16K 1/44* (2013.01)

(58) Field of Classification Search
CPC . F16K 25/005; F16K 1/36; F16K 1/44; F16K 1/46; F16K 25/00; F16K 1/465; F16K 11/044
USPC ................................................ 251/332–334
See application file for complete search history.

(56) References Cited

U.S. PATENT DOCUMENTS

| | | | | |
|---|---|---|---|---|
| 898,383 | A | * | 9/1908 | Mortimer ............... F16K 11/044 137/625.27 |
| 927,683 | A | * | 7/1909 | Schuermann ......... F16K 11/044 137/627.5 |
| 2,714,394 | A | * | 8/1955 | Moran .................. F16K 11/044 137/614.13 |
| 2,925,993 | A | * | 2/1960 | Downs et al. ................. 251/328 |
| 3,438,391 | A | * | 4/1969 | Yocum ..................... 137/516.29 |

(Continued)

FOREIGN PATENT DOCUMENTS

| | | |
|---|---|---|
| CN | 102454808 A | 5/2012 |
| JP | S57009363 A | 1/1982 |

(Continued)

OTHER PUBLICATIONS

State Intellectual Property Office of the People's Republic of China, Office Action and Search Report Issued in Application No. 201310353899.0, Nov. 2, 2016, 8 pages. (Submitted with Translation of Office Action).

*Primary Examiner* — Michael R Reid
(74) *Attorney, Agent, or Firm* — Alleman Hall Creasman & Tuttle LLP (57) ABSTRACT

The present invention is directed a valve element which is intended to improve a sealing property at a time of closing a fluid control valve and to improve stability while maintaining durability for a long time period, wherein the valve element constitutes one of a valve seat surface or a seating surface and the valve element includes a concave portion formed in an opposing surface facing the valve seat surface and a resin coating film which is formed in the concave portion and contacts the valve seat surface.

3 Claims, 11 Drawing Sheets

(56) References Cited

U.S. PATENT DOCUMENTS

| | | | | |
|---|---|---|---|---|
| 3,967,808 | A * | 7/1976 | Lieding | F16K 1/34 |
| | | | | 251/359 |
| 4,027,852 | A * | 6/1977 | Braukmann | F16K 1/34 |
| | | | | 251/333 |
| 5,772,181 | A * | 6/1998 | Robertson, III | F16K 1/16 |
| | | | | 251/129.06 |
| 6,089,262 | A * | 7/2000 | Hart | B60T 11/326 |
| | | | | 137/543.19 |
| 6,345,803 | B2 * | 2/2002 | Sakurai | 251/129.02 |
| 2003/0145615 | A1 * | 8/2003 | Sasaki | F04B 27/1804 |
| | | | | 62/228.3 |
| 2006/0102866 | A1 * | 5/2006 | Yamagishi | 251/333 |
| 2006/0131531 | A1 * | 6/2006 | Ohmori | F16K 1/36 |
| | | | | 251/129.15 |
| 2006/0273277 | A1 * | 12/2006 | Heller | H01J 37/32495 |
| | | | | 251/334 |

FOREIGN PATENT DOCUMENTS

| | | | |
|---|---|---|---|
| JP | H09269073 | A | 10/1997 |
| JP | 2000322129 | A | 11/2000 |
| JP | 2004060709 | A | 2/2004 |

* cited by examiner

VALVE ELEMENT AND FLUID CONTROL VALVE

TECHNICAL FIELD

The present invention relates to a fluid control valve for use in, for example, a mass flow controller and the like for controlling a flow rate of gas, and in particular relates to a valve body or valve seat for use in the fluid control valve.

BACKGROUND ART

As a mass flow controller for controlling a flow rate of gas for use in, for example, a semiconductor process, there has been known a configuration as shown in Patent Literature 1.

A fluid control valve built in this mass flow controller includes: a valve seat having a valve port formed to communicate with an upstream side flow passage; a diaphragm valve body seated on the valve seat to close the valve port; and an actuator for driving the diaphragm valve body. In this configuration, in order to improve a sealing property while preventing an internal leakage of the fluid, a resin coating is applied over an entire lower surface facing the valve seat in the diaphragm valve body.

Herein, since the sealing property cannot be ensured if there is unevenness on a surface of a thin film formed by the resin coating, the surface of the thin film is required to have flatness with high precision. Therefore, it is necessary to polish the surface of the thin film by a process such as plane-lapping and the like.

However, since the thin film formed by the resin coating is thin in film thickness and low in hardness, a lapped surface formed by the plane-lapping tends to incline, and this results in a problem that the thin film may peel off and the film thickness may not be uniform due to side cutting. Therefore, even though the polishing process such as plane-lapping is performed, the sealing property is not sufficiently ensured, and also it becomes difficult to maintain durability for a long time period.

CITATION LIST

Patent Literature

Patent Literature 1: JP2000-322129A

SUMMARY OF INVENTION

Technical Field

Therefore, the present invention has been made to solve the problems described above, and an object thereof is to improve flatness of a surface of a resin coating to thereby allow for a uniform film thickness of the resin coating, to improve a sealing property at a time of closing a fluid control valve, and to improve stability of the sealing property by maintaining durability for a long time period.

Solution to Problem

That is, a valve element according to the present invention constitutes one of a valve seat surface or a seating surface seated on the valve seat surface, wherein the valve element includes:

a concave portion formed in an opposing surface facing the other of the valve seat surface or the seating surface; and a resin coating film which is formed in the concave portion and contacts the other of the valve seat surface or the seating surface.

With this valve element, since the concave portion is formed in the opposing surface of the valve element and the resin coating film is formed in the concave portion, the resin coating film contacts the other of the valve seat surface or the seating surface, whereby the sealing property can be improved at the time of closing the fluid control valve.

Further, since the resin coating film is formed in the concave portion, when a surface of the resin coating film is polished, an opposing surface portion other than the concave portion acts as a guide for polishing the surface to thereby allow for a uniform the film thickness of the resin coating film while improving the flatness of the resin coating film.

Moreover, since the film thickness of the resin coating film is sufficiently small with respect to a main body of the valve element having the opposing surface, a thermal expansion amount of the resin coating film can be made small with respect to a thermal expansion amount of the main body of the valve element, whereby a temperature effect due to formation of the resin coating film can be reduced.

In addition, since the sealing property is ensured by the resin coating film, when the other of the valve seat surface or the seating surface contacts the resin coating film, an elastic deformation amount of the resin coating film can be reduced, thereby making it hard to form a contact impression or unevenness on the resin coating film and the sealing property can be ensured for a long time period.

Thus, the sealing property can be improved at the time of closing the fluid control valve and the stability can be improved while maintaining the durability for a long time period.

Preferably, a peripheral portion of the concave portion in the opposing surface is a polish limiting guide portion in the case of polishing the surface of the resin coating film.

With this polish limiting guide portion, a polishing member is pressedly abutted to the polish limiting guide portion to thereby prevent the polishing member from inclining, whereby the film thickness of the resin coating film can be made uniform. Here, the polish limiting guide portion is preferably configured in an outer peripheral portion of the concave portion. With this configuration, even though a part of the polishing member is floated to be inclined with respect to the polish limiting guide portion, the resin coating film located inside the polish limiting guide portion is protected by the polish limiting guide portion. In the case where the resin coating is applied to the outside of the polish limiting guide, the resin coating film outside the polish limiting guide is to be additionally cut away. However, since the outside resin coating portion does not contribute to the valve seal, there is no problem.

In addition, in order to eliminate the additional resin coating portion which does not contribute to the valve seal and stably perform the polishing guided by the polish limiting guide portion, the polish limiting guide portion is preferably formed on the outermost peripheral edge portion of the opposing surface.

The opposing surface preferably includes a driving force acting surface that contacts a drive mechanism for driving the valve element, wherein no resin coating film is formed on the driving force acting surface.

With this configuration, since a stroke amount by the drive mechanism can be transmitted to the valve element without a loss, the sealing property can be ensured for a long time period and the flow rate control can be accurately performed.

In addition, in the case where the resin coating film is formed on the driving force acting surface, when the drive mechanism applies the driving force onto the driving force acting surface, the resin coating film is elastically deformed and a stroke amount by the drive mechanism is partly absorbed. Therefore, it is difficult to ensure the sealing property for a long time period and it is difficult to accurately perform the flow rate control.

Advantageous Effects of Invention

According to the present invention configured as described above, since the concave portion is formed in the opposing surface and the resin coating film is formed in the concave portion, the film thickness of the resin coating film can be made uniform while improving the flatness of the resin coating surface. Thus, the sealing property can be improved at the time of closing the fluid control valve and the stability can be improved while maintaining the durability for a long time period.

DESCRIPTION OF EMBODIMENTS

First Embodiment

The following describes one embodiment of a mass flow controller 100 incorporating a fluid control valve including a valve element according to the present invention referring to the accompanying drawings.

Figure 1:
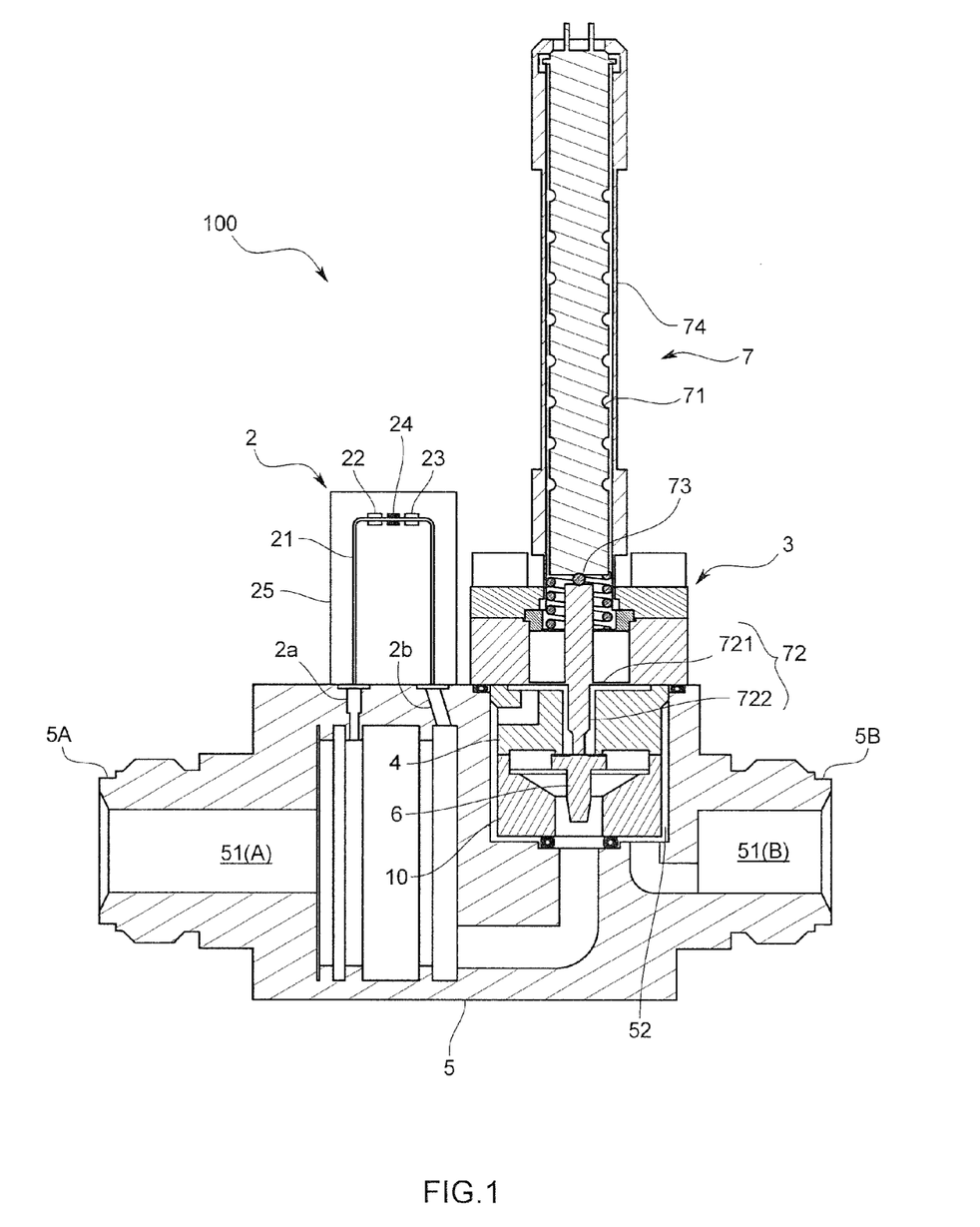
FIG. 1 is an overall cross-sectional view of a mass flow controller in a first embodiment.

The mass flow controller 100 of the present embodiment is intended to be used in a semiconductor manufacturing apparatus, and as shown in FIG. 1, the mass flow controller 100 is equipped with: a body 5; a flow rate detecting mechanism 2; a fluid control valve 3; and a control unit (not shown). In this body 5, formed is a flow passage 51 through which fluid such as gas flows, wherein the gas is a measurement target to be used, for example, in a semiconductor process. The flow rate detecting mechanism 2 is adapted to sense a flow rate of the fluid flowing through the flow passage 51 in this body 5. The fluid control valve 3 is adapted to control the flow rate of the fluid flowing through the flow passage 51. The control unit (not shown) is adapted to control a valve opening degree of the fluid control valve 3 for closely approximating a measurement flow rate outputted from the flow rate detecting mechanism 2 to a predetermined set flow rate. Each of the parts is described in detail as follows.

The body 5 is formed to have a block-like shape through which the flow passage 51 penetrates, wherein an upstream end of the flow passage 51 serving as an upstream side port 5A is connected to an external inlet pipe (not shown) and a downstream end thereof serving as a downstream side port 5B is connected to an external outlet pipe (not shown).

As the flow rate detecting mechanism 2, there may be conceivable various types such as a thermal type, Coriolis type, ultrasonic type and the like, and in this case, there is adopted a so-called thermal flow rate detecting mechanism. This thermal flow rate detecting mechanism 2 is equipped with: a capillary 21 which is connected in parallel with the flow passage 51 so that partial fluid of a predetermined ratio of the entire fluid flowing through the flow passage 51 is to be guided; a heater 24 provided on the capillary 21; and a pair of temperature sensors 22 and 23 provided in the front and rear of the heater 24. Thus, in the case where the fluid flows through the capillary 21, there occurs a temperature difference corresponding to a mass flow rate thereof between these two temperature sensors 22 and 23, whereby it is configured that the flow rate is measured based on this temperature difference.

In this embodiment, it is configured that, while providing an elongated housing 25 for accommodating the capillary 21, heater 24, temperature sensors 22 and 23 and a peripheral electrical circuit thereof, there are provided a pair of branch flow passages 2a and 2b branched from the flow passage 51 of the body 5 and the housing 25 is attached to the body 5, whereby an introduction port of the capillary 21 is connected to the branch flow passage 2a in the upstream side and a derivation port of the capillary 21 is connected to the branch flow passage 2b in the downstream side. It is noted that the flow rate sensor is not limited to this type.

The fluid control valve 3 is a normally closed typed one provided on the flow passage 51 and this fluid control valve 3 is provided with: a pair of valve elements, i.e., a valve seat member 4 and a valve body member 6 accommodated in the body 5; and an actuator 7 for driving the valve body member 6 to set a valve opening degree, i.e., to set a space distance between the valve seat member 4 and the valve body member 6.

Figure 2:
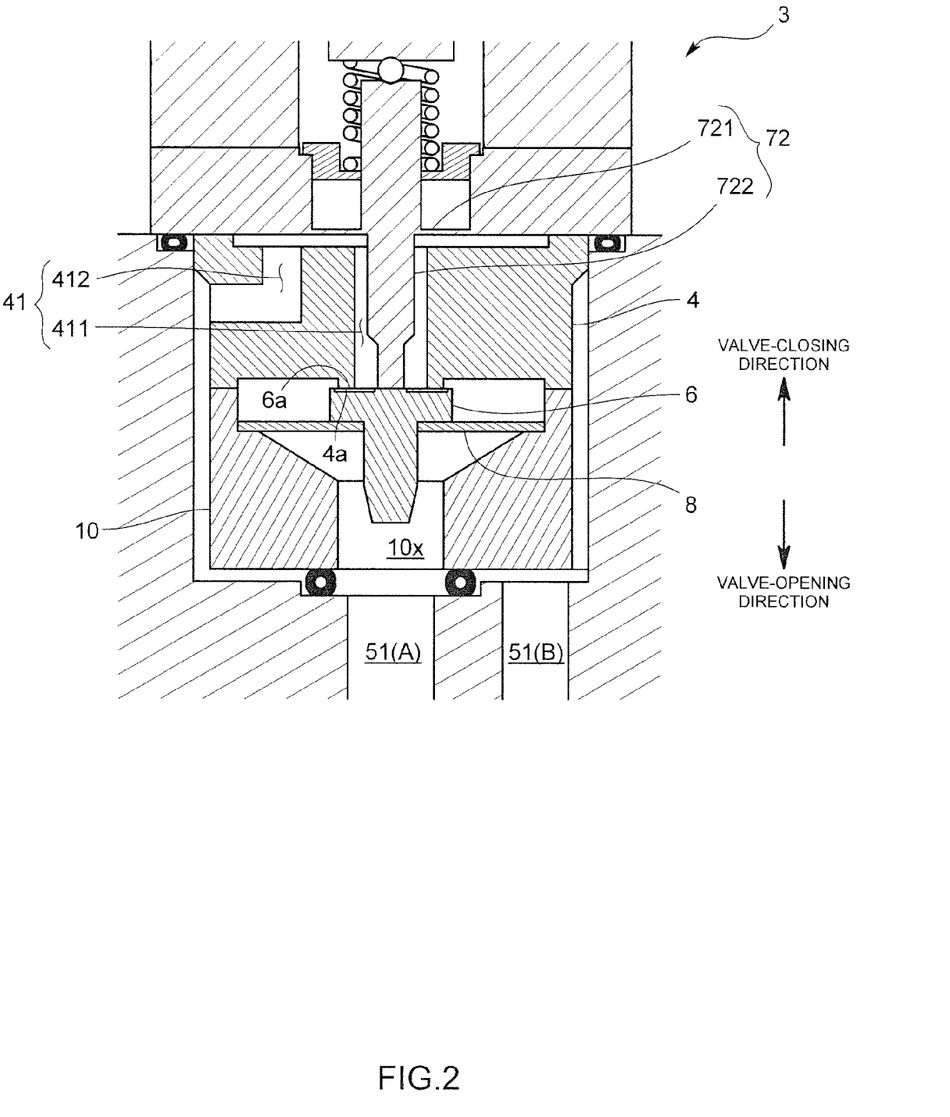
FIG. 2 is a cross-sectional view of a fluid control valve in the first embodiment.

The valve seat member 4 is intended to be a valve seat, and as shown in FIG. 2, this valve seat member 4 is formed to have a generally rotary body shape with its lower surface including a valve seat surface 4a projecting to a side of the valve body member 6, and an internal flow passage 41 is formed inside the valve seat member 4. In the present embodiment, the internal flow passage 41 includes a first internal flow passage 411 and a second internal flow passage 412, wherein one end of the first internal flow passage 411 is opened to the valve seat surface 4a and the other end thereof is opened to an upper surface of the valve seat member 4 and wherein one end of the second internal flow passage 412 is opened to the upper surface of the valve seat member 4 and the other end thereof is opened to a side peripheral surface of the valve seat member 4. Further, a drive shaft (i.e., an abutment shaft portion 722) of the actuator 7 to be described later is inserted to the first internal flow passage 411. Here, one end opening of the first internal flow passage 411 is opened to a central portion of the valve seat surface 4a and the valve seat surface 4a is thereby formed to have a generally annular shape in plan view. Further, the first internal flow passage 411 and the second internal flow passage 412 communicate with each other via a space which is formed of a concave portion formed on the upper surface of the valve seat member 4 and a diaphragm member 721 for closing the concave portion. It is noted that the internal flow passage 41 is not limited to the configuration that includes the first and second internal flow passages 411 and 412, and the internal flow passage 41 may be configured such that the first and second internal flow passages 411 and 412 communicate within the valve seat member 4.

This valve seat member 4 is accommodated in a column-shaped accommodating concave portion 52 provided in the body 5. This accommodating concave portion 52 is arranged so as to divide a flow passage 51 of the body 5 into an upstream side flow passage 51(A) and a downstream side flow passage 51(B). The upstream side flow passage 51(A) of the flow passage 51 divided by this accommodating concave portion 52 is configured to be opened to, for example, a central portion of a bottom surface of the accommodating concave portion 52 and the downstream side flow passage 52(B) of the flow passage 51 divided by this accommodating concave portion 52 is configured to be opened to, for example, a peripheral edge portion of the bottom surface or a side surface of the accommodating concave portion 52.

Thus, in a state of accommodating the valve seat member 4 in the accommodating concave portion 52, a gap is formed between an outer peripheral surface of the valve seat member 4 and an inner peripheral surface of the accommodating concave portion 52, resulting in that the downstream side flow passage 51(B) of the body 5 is communicated to the internal flow passage 41 via the side peripheral surface of the accommodating concave portion 52.

The valve body member 6 is intended to be a valve body which is formed to have a generally rotary body shape having a seating surface 6a on its upper surface, and this valve body member 6 is arranged so as to oppose to the valve seat member 4 in the accommodating concave portion 52 of the body 5 and arranged via a predetermined space from the inner peripheral surface of the accommodating concave portion 52 without contacting this inner peripheral surface.

Thus, the valve body member 6 is forcibly urged by receiving a driving force generated by the actuator 7 serving as a drive mechanism and moved from a close state in which the valve body member 6 is in contact with the valve seat member 4 to block the upstream side flow passage 51(A) and downstream side flow passage 51(B) to an open state in which the valve body member 6 is spaced away from the valve seat member 4 to communicate the upstream side flow passage 51(A) with the downstream side flow passage 51(B). In this way, a direction toward the open state from the close state, that is, an acting direction of the driving force by the actuator 7 to the valve body member 6 corresponds to a valve opening direction. Meanwhile, a direction toward the close state from the open state, that is, an opposite direction to the acting direction of the driving force by the actuator 7 to the valve body member 6 corresponds to a valve closing direction.

The actuator 7 is provided with, for example, a piezoelectric stack 71 which is formed by laminating a plurality of piezoelectric elements and an actuating body 72 which is displaced by extending the piezoelectric stack. This piezoelectric stack 71 is accommodated in the casing member 73 and its distal end is connected to the actuating body 72 via an intermediate connection member 74. The actuating body 72 of the present embodiment includes a diaphragm member 721 and an abutment shaft portion 722 which is provided at a center of the diaphragm member 721 and penetrates a center of the valve seat member 4 (first internal flow passage 411) to abut to an upper surface of the valve body member 6. Thus, the piezoelectric stack 71 is extended by applying a predetermined voltage, whereby the actuating body 72 forcibly urges the valve body member 6 in the valve opening direction and the valve seat surface 4a is spaced away from the seating surface 6a to be in the open state. Moreover, upon applying a voltage below the predetermined voltage, the valve seat surface 4a is spaced away from the seating surface 6a by a distance corresponding to the voltage value. Then, the upstream side flow passage 51(A) and downstream side flow passage 51(B) communicate through this gap.

Further, the valve body member 6 is provided with a valve body return spring 8 for forcibly urging the valve body member 6 in the valve close direction. By this valve body return spring 8, the valve body member 6 is in the close state in a normal state in which no voltage is applied to the actuator 7.

This valve body return spring 8 is a plate spring which is supported by a spring guide member 10 accommodated in the accommodating concave portion 52 of the body 5 and is provided to be in contact with a downward surface of the valve body member 6 as shown in FIG. 2. It is noted that an elastic member other than the plate spring may be used as the valve body return spring 8 so long as the elastic member forcibly urges the valve body member 6. The elastic member may forcibly urge the valve body member 6 directly or indirectly.

The spring guide member 10 is formed to have a generally rotary body shape with a concave shape in cross-section for supporting the valve body return spring 8 in the accommodating concave portion 52, and in a bottom wall of this spring guide member 10, there is formed an opening portion 10x communicated to the upstream side flow passage 51(A) which opens to the bottom surface of the accommodating concave portion 52, and an upper end portion of a side peripheral wall of the spring guide member 10 is in contact with the peripheral edge portion of the valve seat member 4. The valve body return spring 8 is provided on an inner peripheral surface of the spring guide member 10. In the present embodiment as described above, it is configured that the valve body member 6 is accommodated in the space formed by the valve seat member 4 and the spring guide member 10. Further, the valve body member 6 is disposed with a predetermined distance from the inner peripheral surface of the spring guide member 10, and an outer peripheral surface of the valve body member 6 is spaced from the inner peripheral surface of the spring guide member 10 facing the outer peripheral surface.

Figure 3:
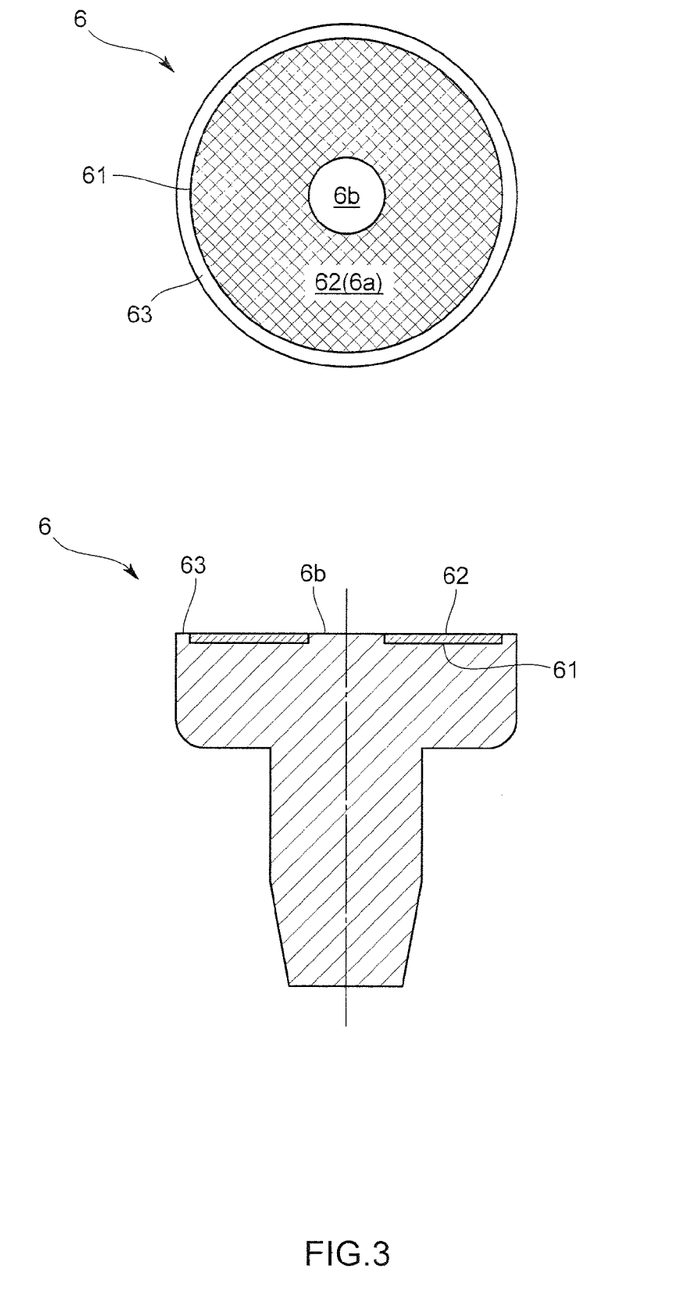
FIG. 3 is a top plan view and cross-sectional view of a valve body member of the first embodiment.

Thus, in the valve body member 6 which is one of the valve elements of the present embodiment, there is formed a concave portion 61 in an opposing surface (upper surface) facing the valve seat surface 4a of the valve seat member 4. In the concave portion 61, there is formed a resin coating film 62 contacting the valve seat surface 4a of the valve seat member 4. It is noted that the valve body member 6 is formed of a material having excellent heat resistance and corrosion resistance, and in the present embodiment, the valve body member 6 is formed of stainless steel. However, the valve body member 6 may be formed of the other high heat-resistant and corrosion-resistant alloys such as hastelloy.

The concave portion 61 is formed so as to surround a driving force acting surface 6b which contacts the abutment shaft portion 722 of the actuator 7 to receive a driving force and the concave portion 61 has a generally annular shape in plan view and a generally U character shape in cross-section. The driving force acting surface 6b is formed in the central portion of the upper surface of the valve body member 6 and is formed to have slightly larger than a contacting area contacting with the abutment shaft portion 722. In this way, the driving force acting surface 6b and concave portion 61 are concentrically formed in the upper surface of the valve body member 6.

This concave portion 61 has a shape corresponding to the valve seat surface 4a and is shaped to have a range including a range of the valve seat surface 4a in a state that the valve body member 6 is seated on the valve seat member 4, wherein the depth of the concave portion 61 is, for example, 50 to 150 μm.

Further, a ridge portion formed on the outer peripheral portion of the concave portion 61 serves as a polish limiting guide portion 63. This polish limiting guide portion 63 has a generally annular shape in plan view that is formed on the outermost peripheral portion on the opposing surface (upper surface). The upper surface of this polish limiting guide portion 63 is positioned to be coplanar with the driving force acting surface 6b. In this way, the concave portion 61 and the polish limiting guide portion 63 are concentrically formed on the upper surface of the valve body member 6.

The resin coating film 62 to be formed in the concave portion 61 is formed by coating in the concave portion 61 and its shape in plan view is the same shape as the concave portion 61, that is, a generally annular shape in the present embodiment. The entire part of the valve seat surface 4a contacts the resin coating film 62 formed in this concave portion 61. The thickness of the resin coating film 62 is the same as the depth of the concave portion 61, that is, for example, 50 to 150 μm. In this way, since the thickness of the resin coating film 62 is the same as the depth of the concave portion 61, it is configured that the upper surface of the outer peripheral portion of the concave portion 61 is positioned to be coplanar with the upper surface of the resin coating film 62. Moreover, the resin coating film 62 is formed of, for example, a fluorine resin having excellent heat resistance, corrosion resistance, chemical resistance and low friction characteristics, and (PFA) polyfluoroalkoxy is used in the present embodiment.

Further, in the present embodiment, in order to improve adhesion between the inner surface of the concave portion 61 and the resin coating film 62, a primer resin having an adhesive component is interposed between the inner surface of the concave portion 61 and the resin coating film 62. The primer resin of the present embodiment is obtained by mixing an adhesive component and a fluorine resin, for example, PTFE (polytetrafluoroethylene) or the like. In addition, it is conceivable to improve the adhesion by a roughening process such as a blasting process of the bottom surface of the concave portion 61.

Figure 4:
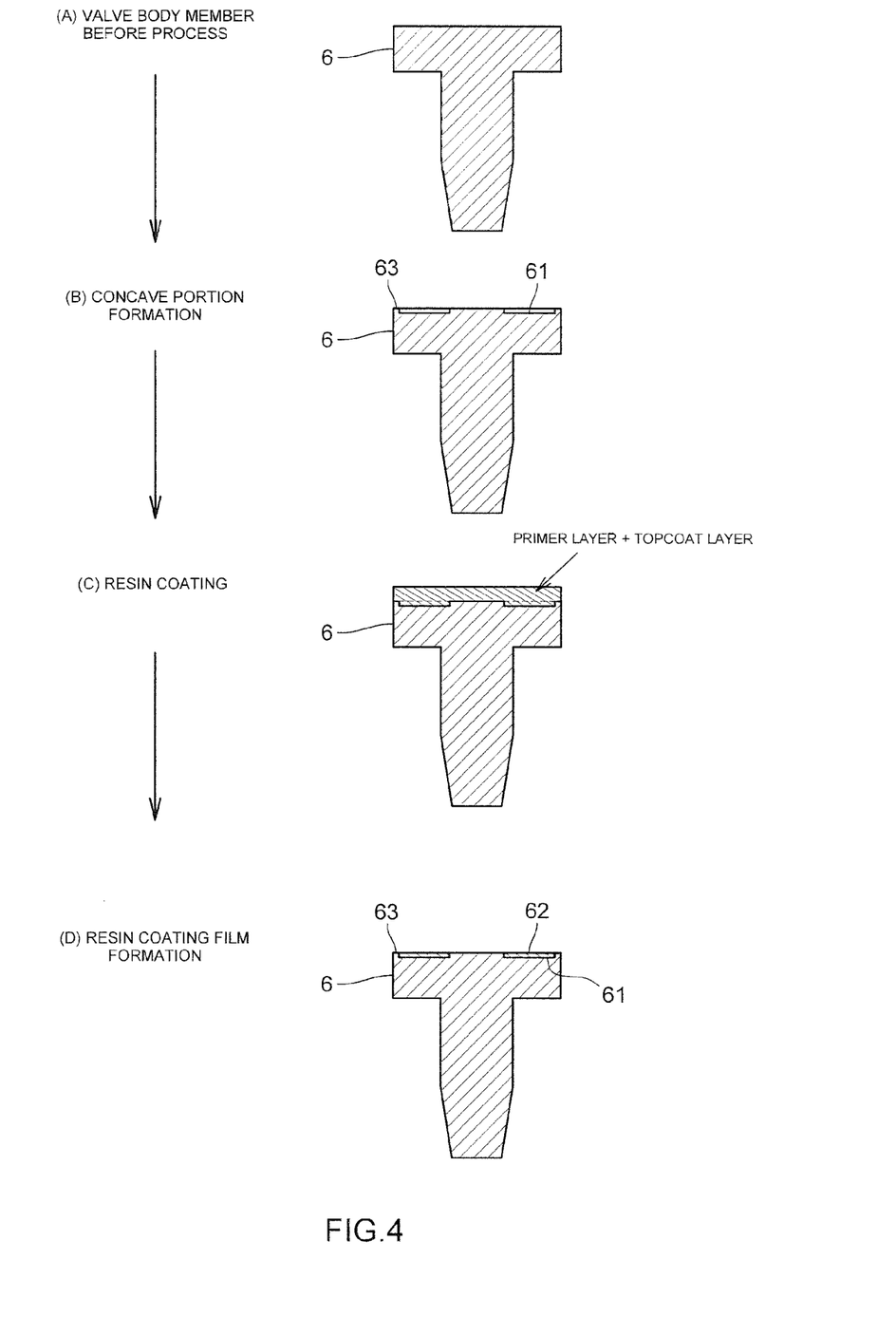
FIG. 4 is a diagram showing a manufacturing method of the valve body member of the first embodiment.

Next, a manufacturing method of the valve body member 6 of the present embodiment is described below referring to FIG. 4.

First, the concave portion 61 is formed on the upper surface of the valve body member 6. As this method of forming the concave portion 61, a machining process such as a cutting process is used. At this time, the bottom surface of the concave portion 61 is made to be a fine uneven shape by a roughening process, whereby the adhesion between the inner surface of the concave portion 61 and the resin coating film 62 can be improved.

Subsequently, the entire upper surface of the valve body member 6 including the concave portion 61 is coated with PTFE which is a primer resin to thereby form a primer layer. Then, the upper surface of the primer layer is coated with, for example, a fluorine resin such as PFA several times by a thin film coating or the like to form a top coat layer to be used as the resin coating film 62. At this time, the total film thickness of the primer layer and the top coat layer is adjusted to be equal to or larger than the depth of the concave portion 61 (for example, 120 μm).

Thereafter, the primer layer and top coat layer formed on the upper surface are polished by a polishing process such as a plane lapping. At this time, the polishing amount is, for example, on the order of 50 μm. That is, not only the primer layer and top coat layer formed on the upper surface of the valve body member 6 but also the inner peripheral portion (i.e., a portion corresponding to the driving force acting surface 6b) and the outer peripheral portion (i.e., polish limiting guide portion 63) of the concave portion 61 formed on the upper surface of the valve body member 6 are polished as well. By this polishing, it is configured that the resin remains only in the concave portion 61 and the resin remaining in the concave portion 61 serves as the resin coating film 62. By polishing the inner peripheral portion and outer peripheral portion of the concave portion 61 in this way, the resin in the concave portion 61 is prevented from being excessively polished and the resin in the concave portion 61 can be polished to have a uniform film thickness. In addition, since the polish limiting guide member 63 is formed throughout in the circumferential direction and this polish limiting guide member 63 is also polished as well, there is no fear that side-cutting of the resin in the concave portion 61 is performed.

According to the mass flow controller 100 of the present embodiment configured as described above, since the concave portion 61 is formed in the opposing surface of the valve body member 6 and the resin coating film 62 is formed in the concave portion 61, the resin coating film 62 contacts the valve seat surface 4a of the valve seat member 4, thereby enabling improvement in the sealing property at the time of closing and reducing an internal leakage amount.

Further, since the resin coating film 62 is formed in the concave portion 61, when the surface of the resin coating film 62 is polished, the opposing surface portion (particularly, polish limiting guide portion 63) other than the concave portion 61 serves as the guide for polishing the surface, whereby the film thickness of the resin coating film 62 can be made uniform while ensuring the flatness of the surface of the resin coating film 62 to thereby obtain a flatness of the seating surface 6a with high precision.

Moreover, since the film thickness of the resin coating film 62 is small (for example, 50 to 150 μm) relative to the entire valve body member 6, a thermal expansion amount of the resin coating film 62 can be reduced relative to a thermal expansion amount of the valve body member 6, whereby it is possible to reduce a temperature effect due to formation of the resin coating film 62.

In addition, since the sealing property is ensured by forming the resin coating film 62 to be a thin film of, for example, 50 to 150 μm, when the valve seat surface 4a of the valve seat member 4 is in contact with the resin coating film 62, an elastic deformation amount of the resin coating film 62 can be reduced and it is hard to form a contact impression or unevenness on the resin coating film 62, whereby the sealing property can be ensured for a long time period.

Thus, it is possible to improve the sealing property in the closing state of the fluid control valve 3 and the stability can be improved while keeping the durability for a long time period. Therefore, in the case where the fluid control valve 3 is incorporated in the mass flow controller, it is possible to perform the flow rate control stably and with high precision for a long time period.

Embodied Example

Next, the following shows results of a performance comparison experiment between the flow rate control valve of the present invention and a conventional flow rate control valve. The flow rate control valve of the present invention refers to that of the present embodiment described above. Meanwhile, in the conventional flow rate control valve, the valve seat member and the valve body member are respectively composed of a valve seat surface made of SUS and a seating surface made of SUS without applying a resin coating to any of the valve seat member and the valve body member.

Figure 5:
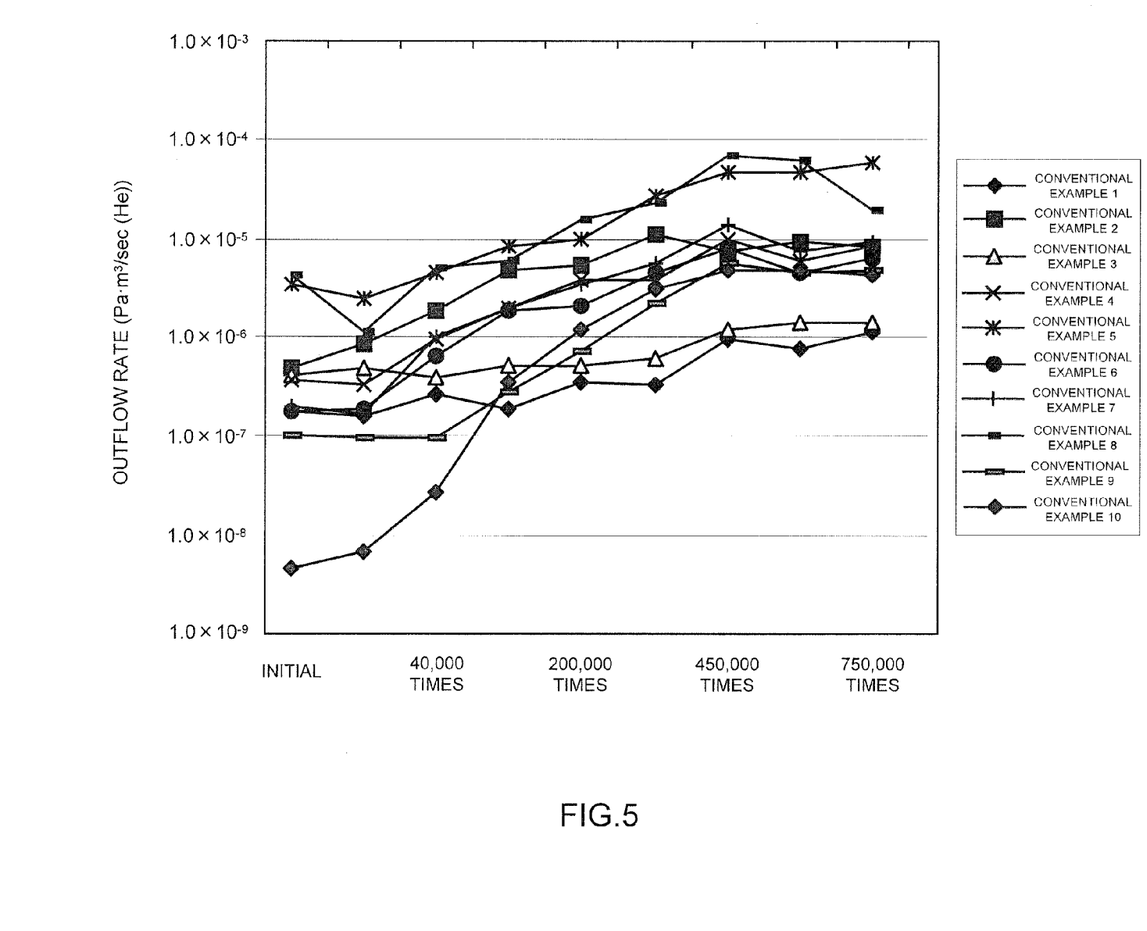
FIG. 5 is a diagram showing a deterioration with time lapse of an outflow rate of a conventional fluid control valve.
Figure 6:
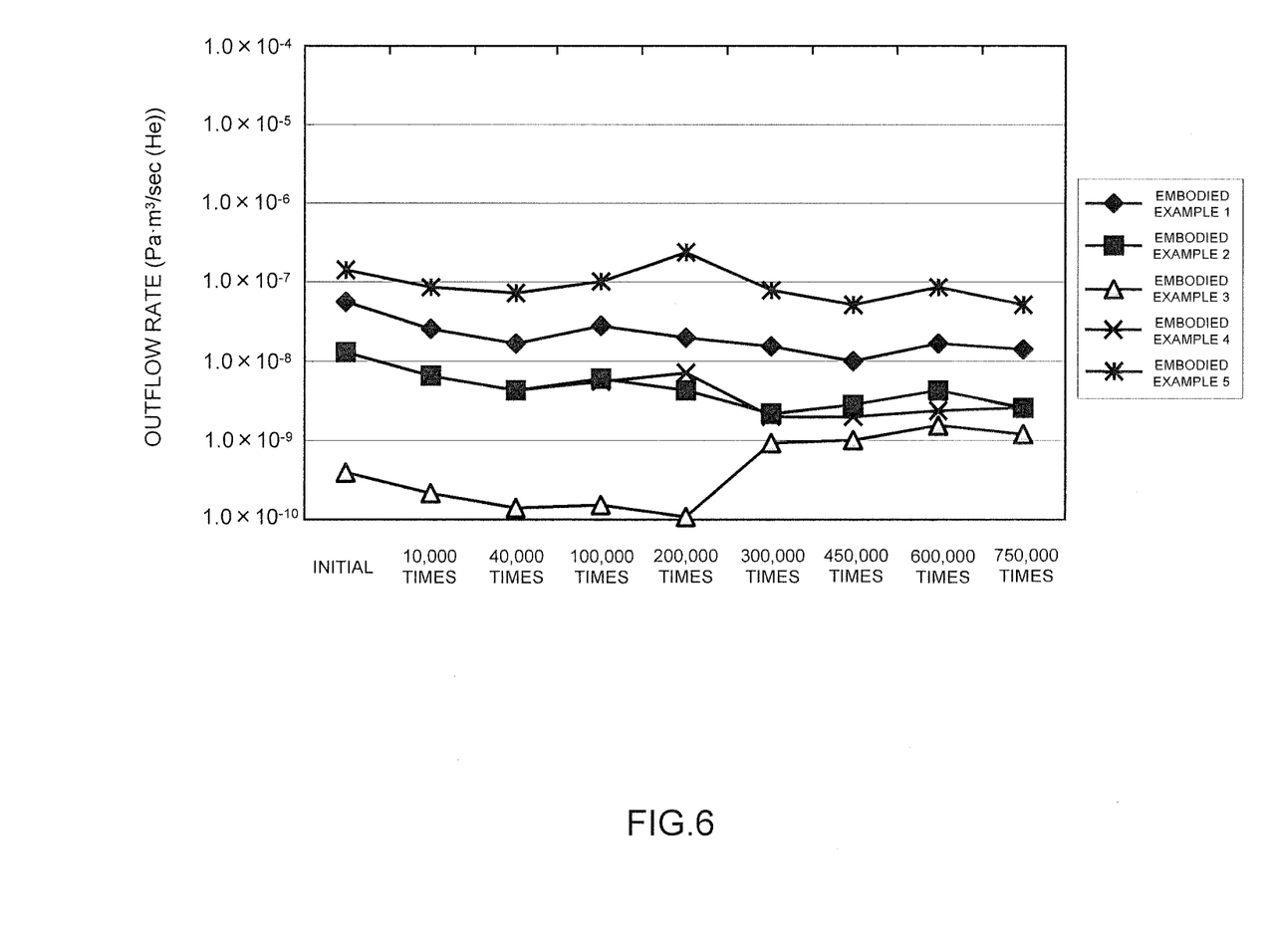
FIG. 6 is a diagram showing a deterioration with time lapse of the fluid control valve of the present invention.

FIG. 5 shows an outflow rate (internal leakage amount) ($Pa \cdot cm^3/sec(He)$) in the conventional flow rate control valve. FIG. 6 shows an outflow rate (internal leakage amount) ($Pa \cdot cm^3/sec(He)$) in the flow rate control valve of the present invention. As apparent from FIG. 5, it is understood that, with use of the flow rate control valve, the outflow rate gradually increases. Meanwhile, as apparent from FIG. 6, it is understood that, in the flow rate control valve of the present invention, the outflow rate remains nearly constant even in the case of using the flow rate control valve. Thus, by applying the resin coating in the concave portion, the outflow rate can be kept substantially constant and the flow rate control valve can be stably used for a long time period. Further, comparing the results shown in FIGS. 5 and 6, it is understood that the outflow rate per se can be reduced by applying the resin coating in the concave portion.

Figure 7:
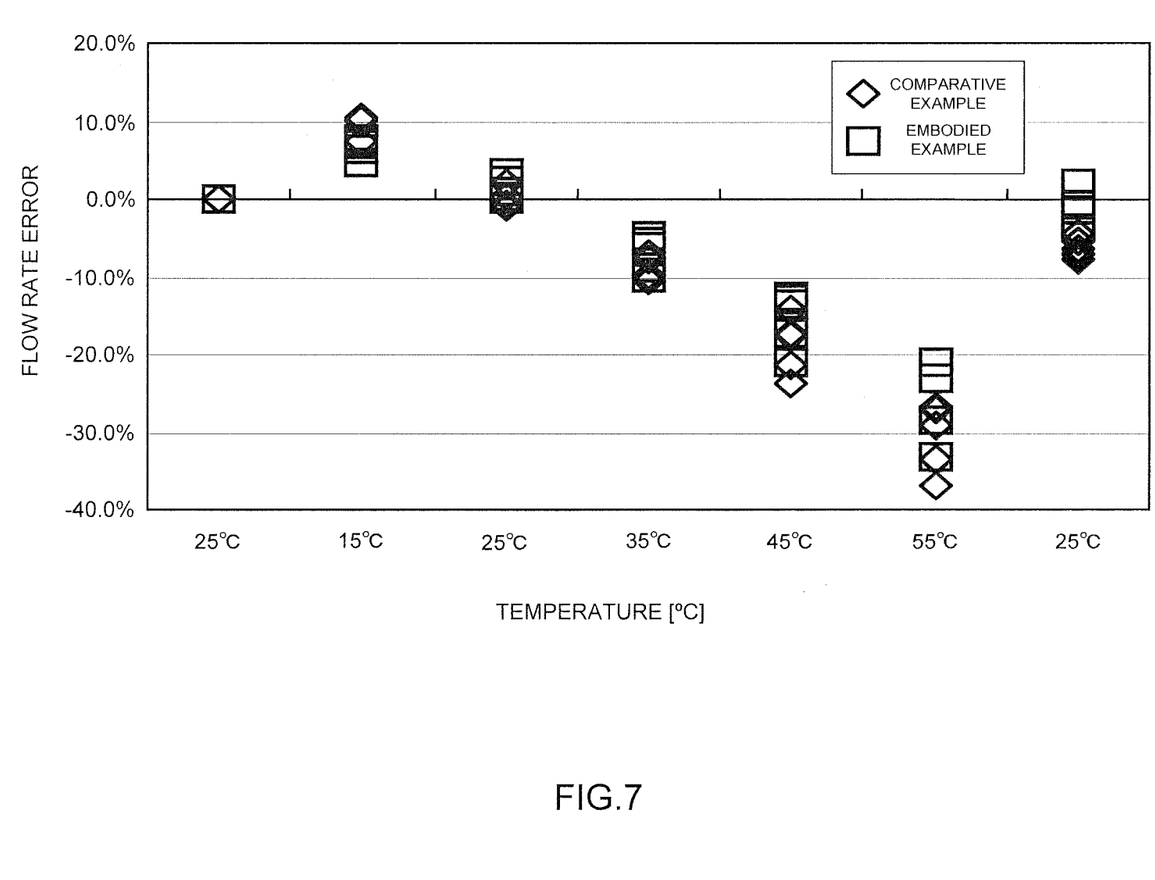
FIG. 7 is a diagram showing valve temperature characteristics of the conventional fluid control valve and fluid control valve of the present invention.

Next, FIG. 7 shows valve temperature rise characteristics of the flow rate control valve of the present invention and the conventional flow rate control valve. The flow rate control valve of the present invention refers to that of the present embodiment described above. Meanwhile, in the conventional flow rate control valve, the valve seat member and the valve body member are respectively composed of a valve seat surface made of SUS and a seating surface made of SUS without applying a resin coating to any of the valve seat member and the valve body member.

The valve temperature rise characteristics shown in FIG. 7 show a flow rate of change relative to an initial reference value when an ambient temperature is changed. Here, the initial reference value is a flow rate of fluid in the case where a voltage of 100V is applied to the actuator under the condition of the ambient temperature being 25° C. As shown in FIG. 7, the flow rate control valve of the present invention shows a temperature rise characteristic substantially similar to that of the conventional flow rate control valve and it is understood that, by forming a resin coating film, the temperature rise characteristic is not deteriorated relative to that of the conventional flow rate control valve.

Figure 8:
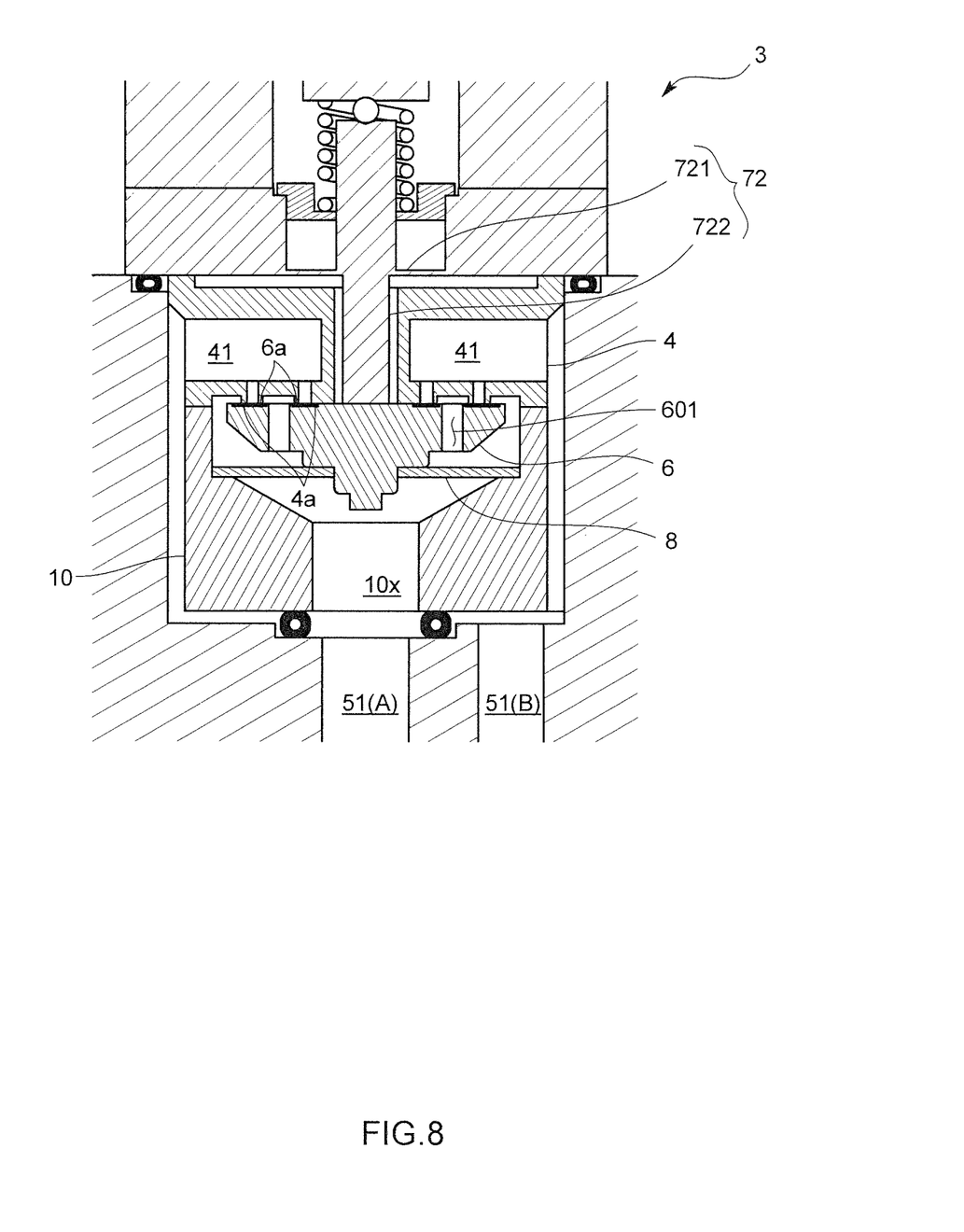
FIG. 8 is a cross-sectional view of a fluid control valve in a modified example of the first embodiment.
Figure 9:
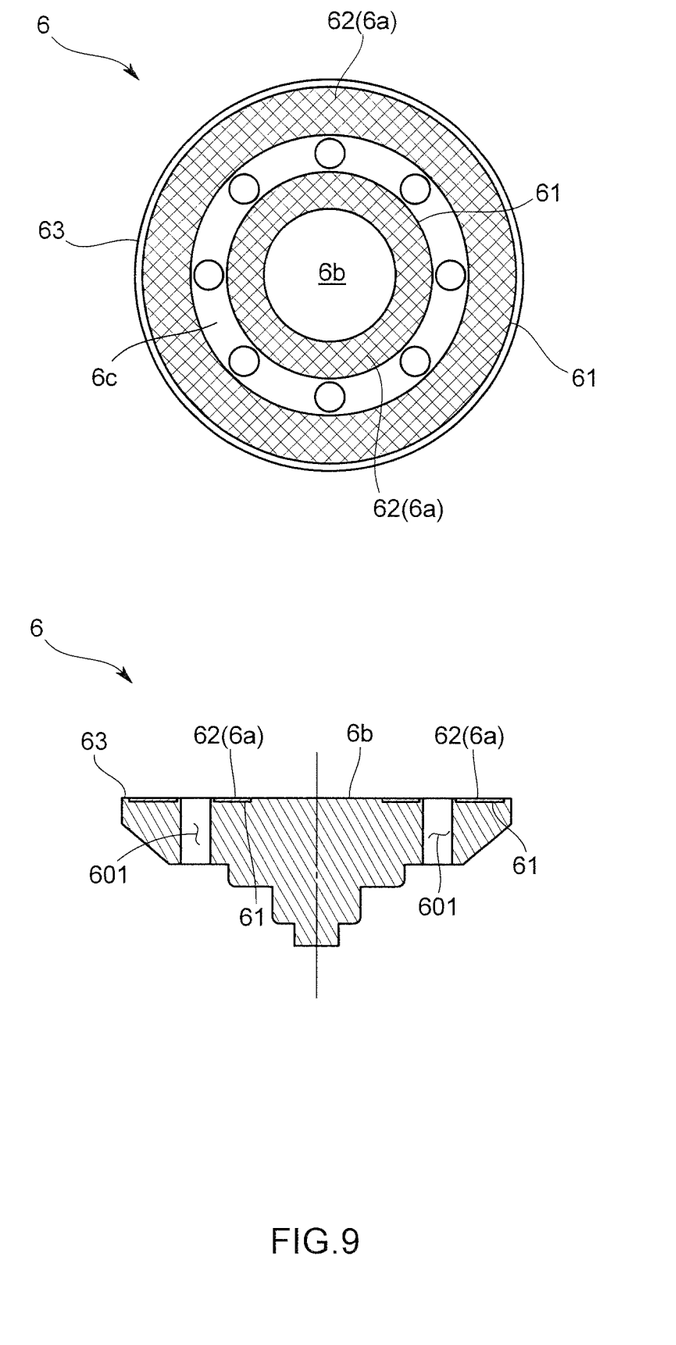
FIG. 9 is a top plan view and cross sectional view of a valve body member in the modified example of the first embodiment.

It is noted that the present invention is not limited to the first embodiment. For example, although the valve body member 6 has a solid shape in the first embodiment, it may be also configured that one or more internal flow passages 601 each having one end opening to the lower surface and the other end opening to the upper surface are formed inside the valve body member 6 as shown in FIGS. 8 and 9, in the case of forming one internal flow passage 601, the opening in the upper surface of the internal flow passage 601 is intended not to be overlapped with the opening in the valve seat surface 4a of the internal flow passage 41. Further, in the case of forming a plurality of internal flow passages 601, the openings of the plurality of internal flow passages 601 in the upper surface (seating surface 6a) are formed in a circular shape (see FIG. 9) and disposed concentrically with the openings in the valve seat surface 4a of the plurality of internal flow passages 41 but not to be overlapped with each other.

In this case, as a configuration of disposing each component on the upper surface of the valve body member 6, the driving force acting surface 6b is formed in the central portion, the concave portion 61 having the resin coating film 62 formed so as to surround the driving force acting surface 6b is formed, an opening forming region 6c of the internal flow passages 601 is formed so as to surround the concave portion 61, the concave portion 61 having the resin coating film 62 formed so as to surround the opening forming region 6c is formed, and the polish limiting guide portion 63 is formed so as to surround the concave portion 61. In FIG. 9, since the openings of the internal flow passages 41 are concentrically formed inside and outside in the lower surface of the valve seat member 4, the concave portions 61 having the resin coating films 62 concentrically formed inside and outside in the upper surface of the valve body member 6 are formed so as to receive the concentrically formed openings of the internal flow passages 41. It is noted that the disposition of the concave portion 61 formed with the resin coating film 62 may be variously modified in accordance with the disposition of the openings of the internal flow passages 41 of the valve seat member 4.

Second Embodiment

A fluid control valve 3 according to the second embodiment is normally open type (NO type) one which is different from the first embodiment in a point that the positions of the valve seat member 4 and the valve body member 6 are reversed. Note that the same reference numerals are assigned to members corresponding to the first embodiment.

Figure 10:
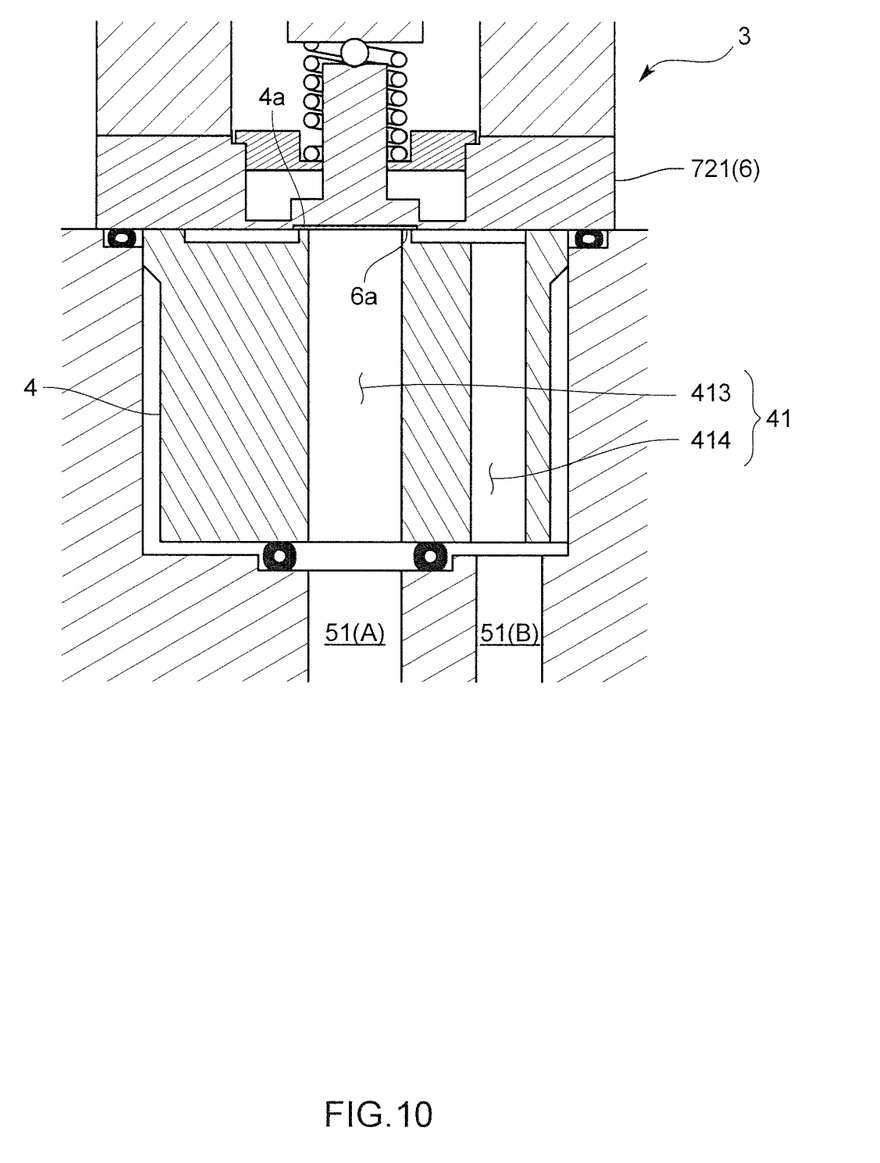
FIG. 10 is a cross-sectional view of a fluid control valve in the second embodiment.

That is, as shown in FIG. 10, a diaphragm member 721 of an actuator 7 corresponds to the valve body member 6 of the first embodiment and the valve seat member 4 is provided in a side of a body 5 rather than the diaphragm member 721. The valve seat member 4 is fitted into an accommodating concave portion 52 provided in the body 5. Similarly to the first embodiment, the accommodating concave portion 52 is arranged so as to divide a flow passage 51 of the body 5.

The valve seat member 4 of the present embodiment is formed to have a generally rotary body shape with its upper surface including a valve seat surface 4a, and an upstream side internal flow passage 413 and a downstream side internal flow passage 414 are formed inside the valve seat member 4. In the present embodiment, the upstream side internal flow passage 413 has one end opened to the valve seat surface 4a and the other end opened to a lower surface of the valve seat member 4. And the other end of this upstream side internal flow passage 413 is communicated to an upstream side flow passage 51(A) which is opened to a bottom surface of the accommodating concave portion 52. Further, the downstream side flow passage 414 has one end thereof opened to a portion of the valve seat member 4, except the valve seat surface 4a, and the other end thereof opened to a lower surface of the valve seat member 4. And the other end of this downstream side internal flow passage 414 is communicated to a downstream side flow passage 51(B) which is opened to the bottom surface of the accommodating concave portion 52.

In a normal state in which no voltage is applied to the actuator 7, the valve body member 6 is in an open state in which the seating surface 6a of the diaphragm member 721 is spaced from the valve seat surface 4a of the valve seat member 4. When a voltage is applied to the actuator 7 to extend this actuator 7, the diaphragm 721 is moved to a valve closing direction, whereby the seating surface 6a of the diaphragm 721 is in close contact with the valve seat surface 4a of the valve seat member 4 to be in a close state.

Figure 11:
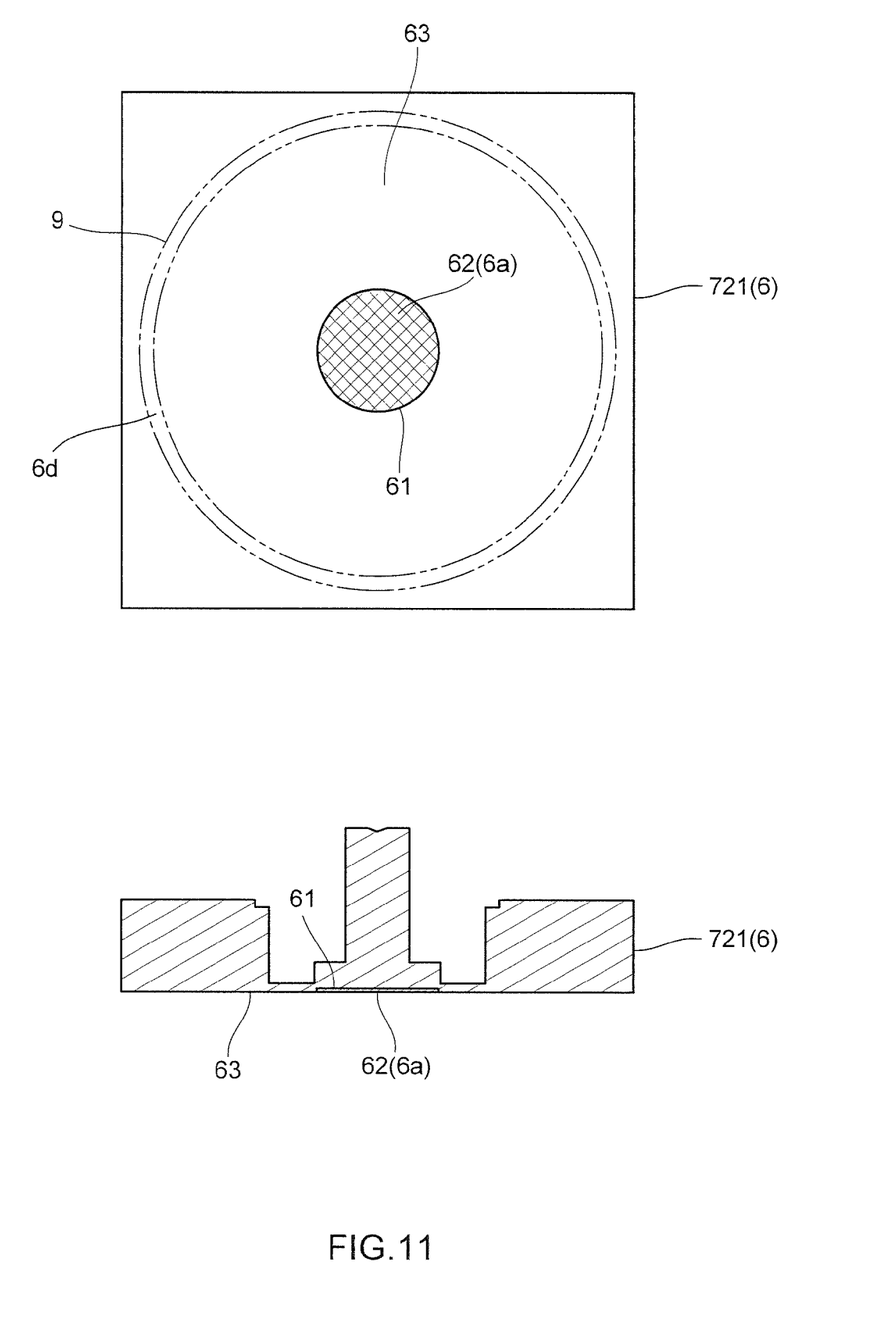
FIG. 11 is a bottom plan view of a valve body member of the second embodiment.

Particularly, in the diaphragm 721, a concave portion 61 is formed in a lower surface which is an opposing surface opposing to the valve seat member 4 as shown in FIG. 11. In this concave portion 61, there is formed a resin coating film 62 having the seating surface 6a which contacts the valve seat surface 4a of the valve seat member 4.

In the present embodiment, the valve seat surface 4a has an annular shape formed in a central portion of the valve seat member 4, wherein the concave portion 61 formed in the diaphragm member 721 is sized to include the valve seat surface 4a. In addition, the depth of the concave portion 61, configuration of the resin coating film 62 and manufacturing method are similar to those of the first embodiment.

Further, a polish limiting guide portion 63 in this case is formed by an outer peripheral portion of the concave portion 61, and in the present embodiment, the outer peripheral portion which is a portion except the central portion where the concave portion 61 is formed in the diaphragm member 721 serves as the polish limiting guide portion 63. Furthermore, a peripheral edge portion of the diaphragm member 721 serves as a seal member contacting surface with which a seal member 9 is in contact at a time of mounting the body 5.

Also, in the fluid control valve 3 of the present embodiment configured as described above, the same effects as in the first embodiment can be obtained.

It is noted that the present invention is not limited to the second embodiment. For example, although the diaphragm 721 of the actuator serves as the valve body member in the second embodiment, a valve body member driven by the diaphragm 721 may be provided between the diaphragm 721 and the valve seat member 4. Also, in this case, there is provided a concave portion having a resin coating film formed on an opposing surface (lower surface) opposing to the valve seat member 4 in the valve body member.

Further, in each of the embodiments, although there is exemplified a configuration that the concave portion 61 having the resin coating film 62 formed therein is provided in the valve body member, it may be also possible that a concave portion is provided in the opposing surface to the valve body member in the valve seat member and the resin coating film contacting the seating surface may be formed in the concave portion.

Moreover, in addition to the valve element constituting the entire valve body member or entire valve seat member, the valve element constituting a part thereof may be used. That is, in the case where the valve body member is composed of a plurality of members, the valve element may be composed of a member having a seating surface. Alternatively, in the case where the valve seat member is composed of a plurality of members, the valve element may be composed of a member having a valve seat surface.

Although the present invention is applied to the flow rate control valve in each of the embodiments, the present invention may be also applied to an ON/OFF switching valve. Further, the actuator is not limited to a piezoelectric type but an electromagnetic coil and the like may be used. Moreover, it is not limited to a mass flow controller incorporating the fluid control valve, but the fluid control valve may be configured as a single unit. In addition, a pressure control valve for controlling a pressure of fluid may be used as the fluid control valve.

In addition, it is needless to say that, the above embodiments and modified embodiment may be partly or entirely combined appropriately and the present invention is not limited to the above embodiments and various changes and modifications can be made within the scope of the present invention unless departing from the spirit thereof.

EXPLANATION OF REFERENCE NUMERALS

3 Fluid control valve
4 Valve seat member
5 Body
6 Valve body member
61 Concave portion
62 Resin coating film
63 Polish limiting guide portion
6b Driving force acting surface
7 Actuator

The invention claimed is:
1. A fluid control valve, comprising:
a valve seat member which has a valve seat surface;
a valve body member which has a seating surface that is seated on the valve seat surface; and
an actuator for driving the valve body member to set a valve opening degree, wherein
the actuator comprises a piezoelectric stack which is formed by laminating a plurality of piezoelectric elements,
the valve body member includes:
a driving force acting surface formed in an opposing surface facing the valve seat surface and which is formed of stainless steel or another alloy and contacts the actuator to receive a driving force;
a cavity formed in only the opposing surface facing the valve seat surface, and which is formed so as to surround the driving force acting surface; and
a resin coating film which is formed in the cavity and contacts an entire part of the valve seat surface,
the resin coating film is wider in a radial direction than the valve seat surface,
a top surface of a peripheral portion of the cavity is positioned to be coplanar with a top surface of the resin coating film, and
the top surface of the peripheral portion is an outermost surface of the valve body member in an open-close direction of the valve body member.
2. The fluid control valve according to claim 1, wherein a depth of the cavity is 150 μm or less, and
a thickness of the resin coating film is the same as the depth of the cavity.
3. The fluid control valve according to claim 1, wherein a bottom surface of the cavity is made to be an uneven shape by a roughening process.

* * * * *